US010671492B2

(12) United States Patent
Mueller et al.

(10) Patent No.: US 10,671,492 B2
(45) Date of Patent: Jun. 2, 2020

(54) FORECAST RECOMMENDED BACKUP DESTINATION

(71) Applicant: International Business Machines Corporation, Armonk, NY (US)

(72) Inventors: Joerg Mueller, Horb (DE); Stefan Alexander, Schkeuditz (DE); Alexander Neef, Reutlingen (DE); Jan Vorbohle, Renningen (DE); Michael H. Schlachter, Metzingen (DE); Klaus Rindtorff, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/845,090

(22) Filed: Dec. 18, 2017

(65) Prior Publication Data
US 2019/0188089 A1    Jun. 20, 2019

(51) Int. Cl.
*G06F 11/14*  (2006.01)
*G06F 16/23*  (2019.01)
*G06F 16/11*  (2019.01)

(52) U.S. Cl.
CPC .......... *G06F 11/1464* (2013.01); *G06F 16/11* (2019.01); *G06F 16/2365* (2019.01); *G06F 2201/80* (2013.01)

(58) Field of Classification Search
CPC ....................................................... G06F 11/14
USPC ...................................................... 707/640
See application file for complete search history.

(56) References Cited

U.S. PATENT DOCUMENTS

| | | | |
|---|---|---|---|
| 6,496,949 B1 * | 12/2002 | Kanevsky | G06F 11/1456 340/3.3 |
| 6,845,435 B2 * | 1/2005 | Nagasawa | G06F 11/1458 711/154 |
| 8,745,010 B2 * | 6/2014 | Chan | G06F 16/113 707/670 |

OTHER PUBLICATIONS

"Comparison of online backup services", Wikipedia, Nov. 29, 2017, 5 pages, <https://en.wikipedia.org/wiki/Comparison_of_online_backup_services>.

* cited by examiner

Primary Examiner — Baoquoc N To
(74) Attorney, Agent, or Firm — Stosch Sabo

(57) ABSTRACT

A method for improving integrity and availability of data in a data center is provided. The data center is part of a network of data centers. The data centers in the network are adapted to act as a backup service provider. The method comprises registering backup service profile data of each of the data centers with viable data. The method also comprises accessing a forecast of monitorable events for a region, analyzing the forecast to predict a potential threat, identifying a data center in the regions, and determine a data center within the network of data centers as backup service provider. If more than one suitable backup service providers is identified, determine a best match backup service provider, establishing a backup communication connection, and transferring data from the source data center to the target data center.

20 Claims, 8 Drawing Sheets

US 10,671,492 B2

FORECAST RECOMMENDED BACKUP DESTINATION

BACKGROUND

The disclosure relates generally to integrity and availability of data, and more specifically, to data centers acting as back up service providers.

The backup of data is a day-to-day business for organizations and for private users; whereas most smartphone data is backed up in the cloud (often manufacturer driven backup services), the majority of companies and privately owned personal computer data is backed up locally. Enterprise IT organizations typically backup their mission-critical data within their own data center and often perform a media switch, e.g., backup to tape. Large enterprises might have a remote data center or backup location where the backup data will be transferred to. Private users often perform the backup locally to hard drives or NAS (network attached storage) systems, and in rare cases the backup of personal computer data may be directed to a remote location.

SUMMARY

According to one aspect of the present disclosure, a method for improving integrity and availability of data in at least one data center may be provided. The data center may be part of a network of data centers. Each of the data centers in the network may be adapted to act as a backup service provider, in particular for every other data center in the network. The method may comprise registering backup service profile data of each of the data centers at a backup service provider registry with at least information about each data center's free storage capacity, a location identifier, a data transfer bandwidth and another attribute.

The method may also comprise accessing a forecast of monitorable events for a region, in which the data center is located in. The forecast may be received from at least one forecast service. Furthermore, the method may comprise analyzing the forecast of monitorable events in order to predict a potential threat for the region, identifying at least one source data center within the network of data centers in the region with the potential threat, and determining at least one data center within the network of data centers to be used as suitable backup service provider by accessing and using data stored in the backup service provider registry.

In case more than one suitable backup service providers is identified, the method may further comprise determining a best-match backup service provider as target data center, establishing a backup communication connection between the source data center and the target data center, and transferring data from the source data center to the target data center.

According to another aspect of the present disclosure, a related data protection system for improving integrity and availability of data in at least one data center may be provided.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the disclosure are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the disclosure is not limited.

Figure 1:
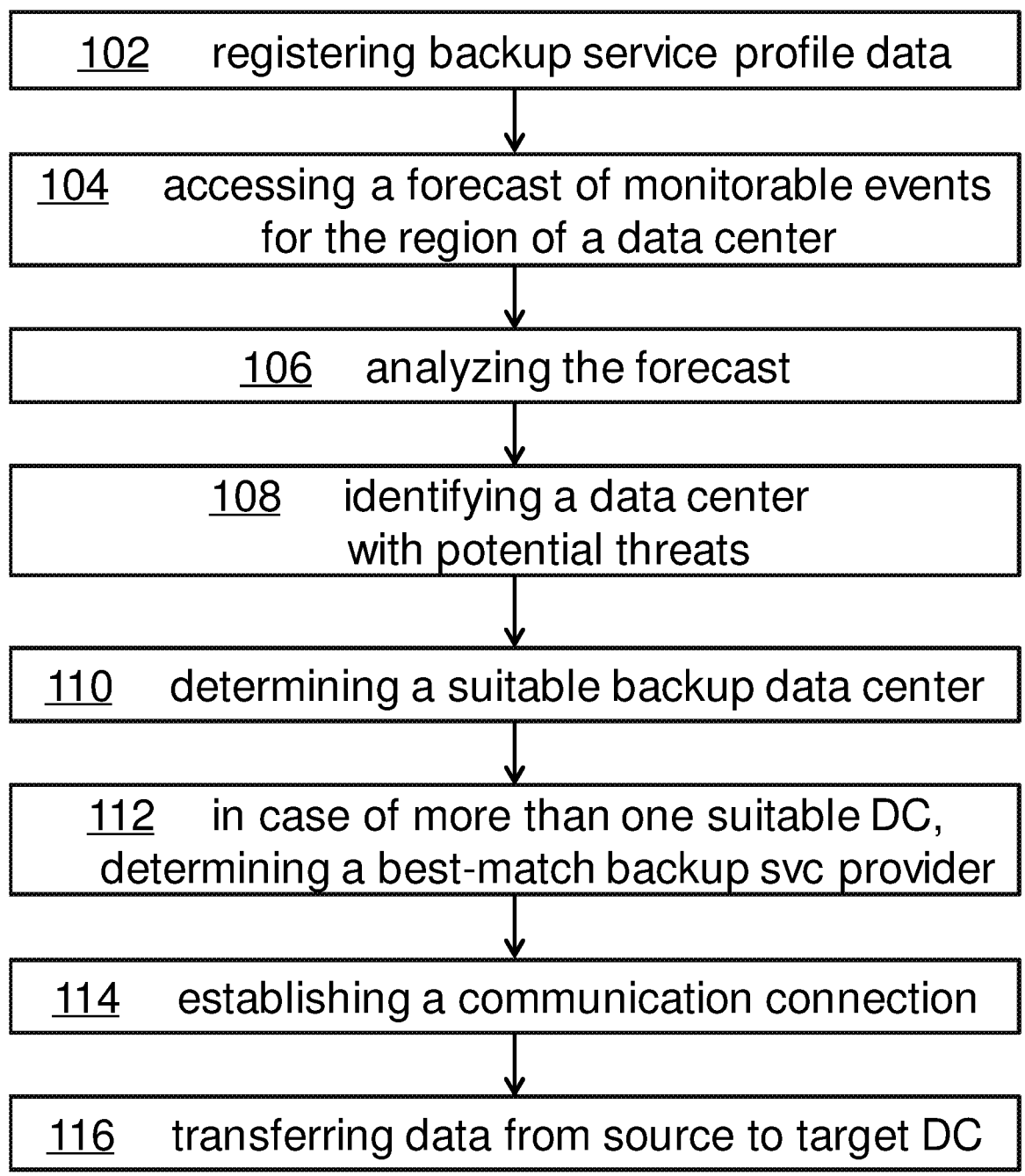

Embodiments of the disclosure will be described, by way of example only, and with reference to the following drawings:

FIG. 1 shows a flowchart of an example method for improving integrity and availability of data in at least one data center in accordance with some embodiments of the present disclosure.

Figure 2:
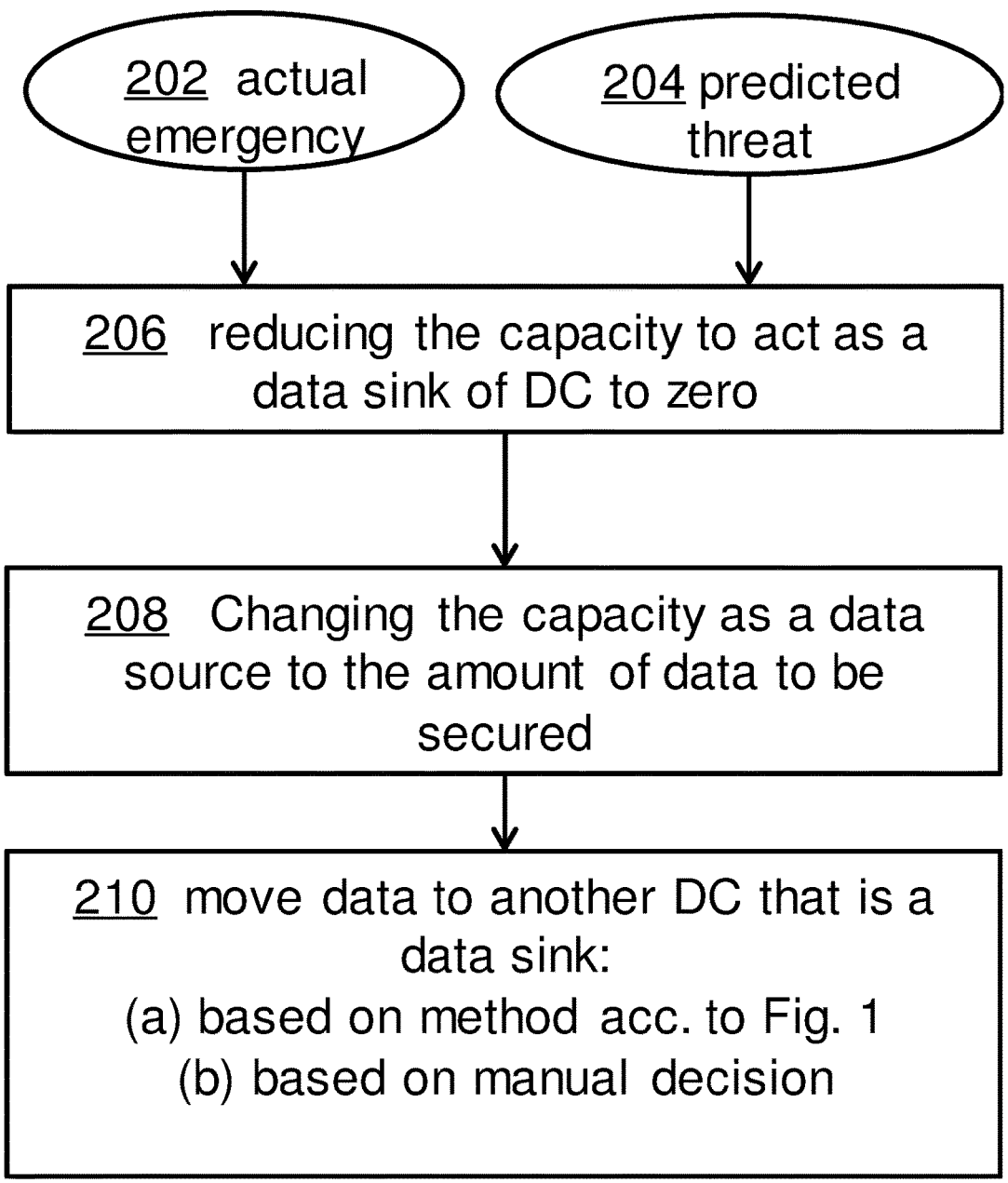

FIG. 2 shows a flowchart of an example sub-method of FIG. 1, in accordance with some embodiments of the present disclosure.

Figure 3:
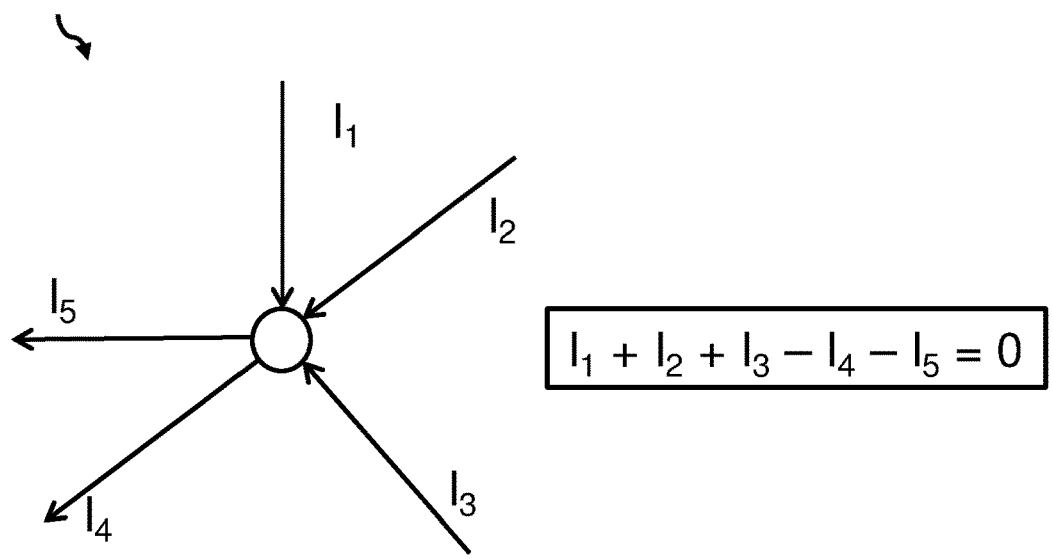

FIG. 3 shows a diagram of an example cost calculation in accordance with some embodiments of the present disclosure.

Figure 4:
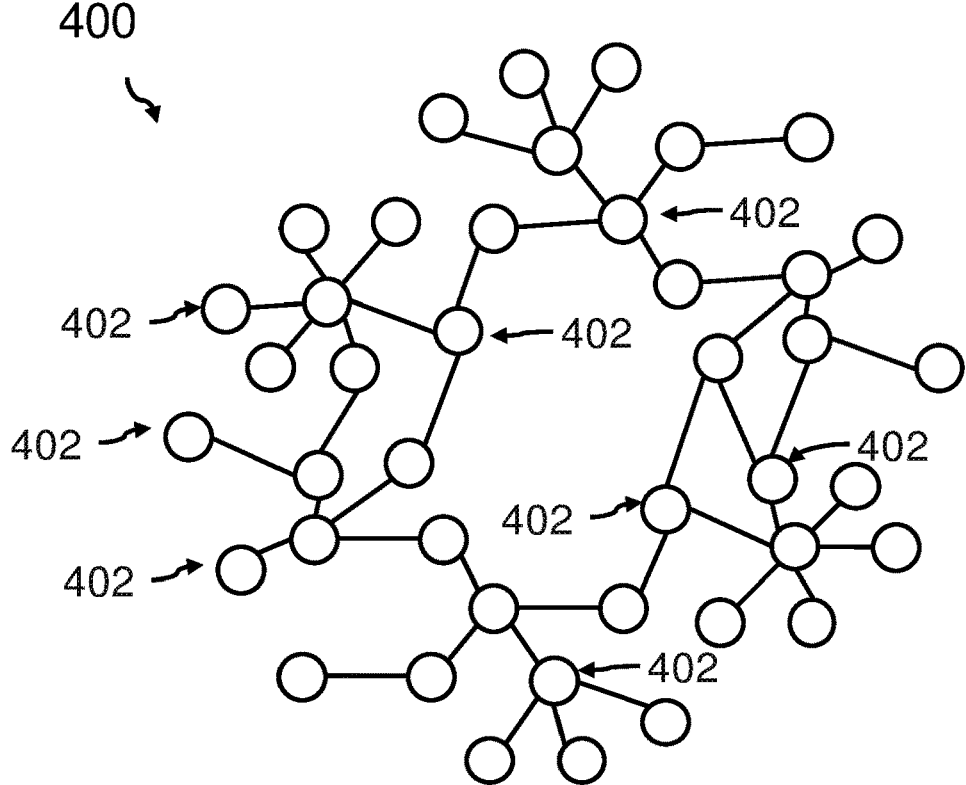

FIG. 4 shows a diagram of an example network of data centers.

Figure 5:
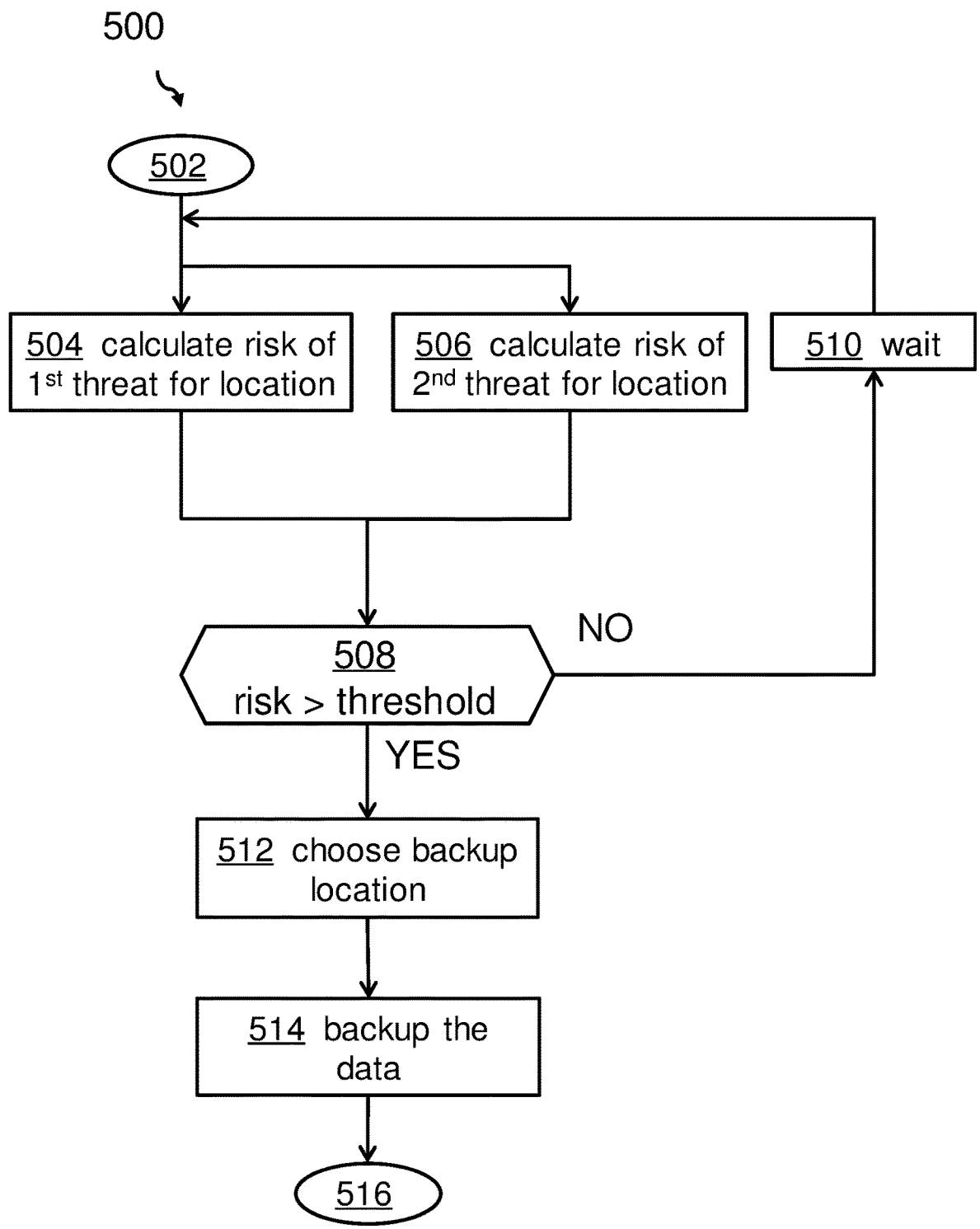

FIG. 5 shows a flowchart of another example method for improving integrity and availability of data in accordance with some embodiments of the present disclosure.

Figure 6:
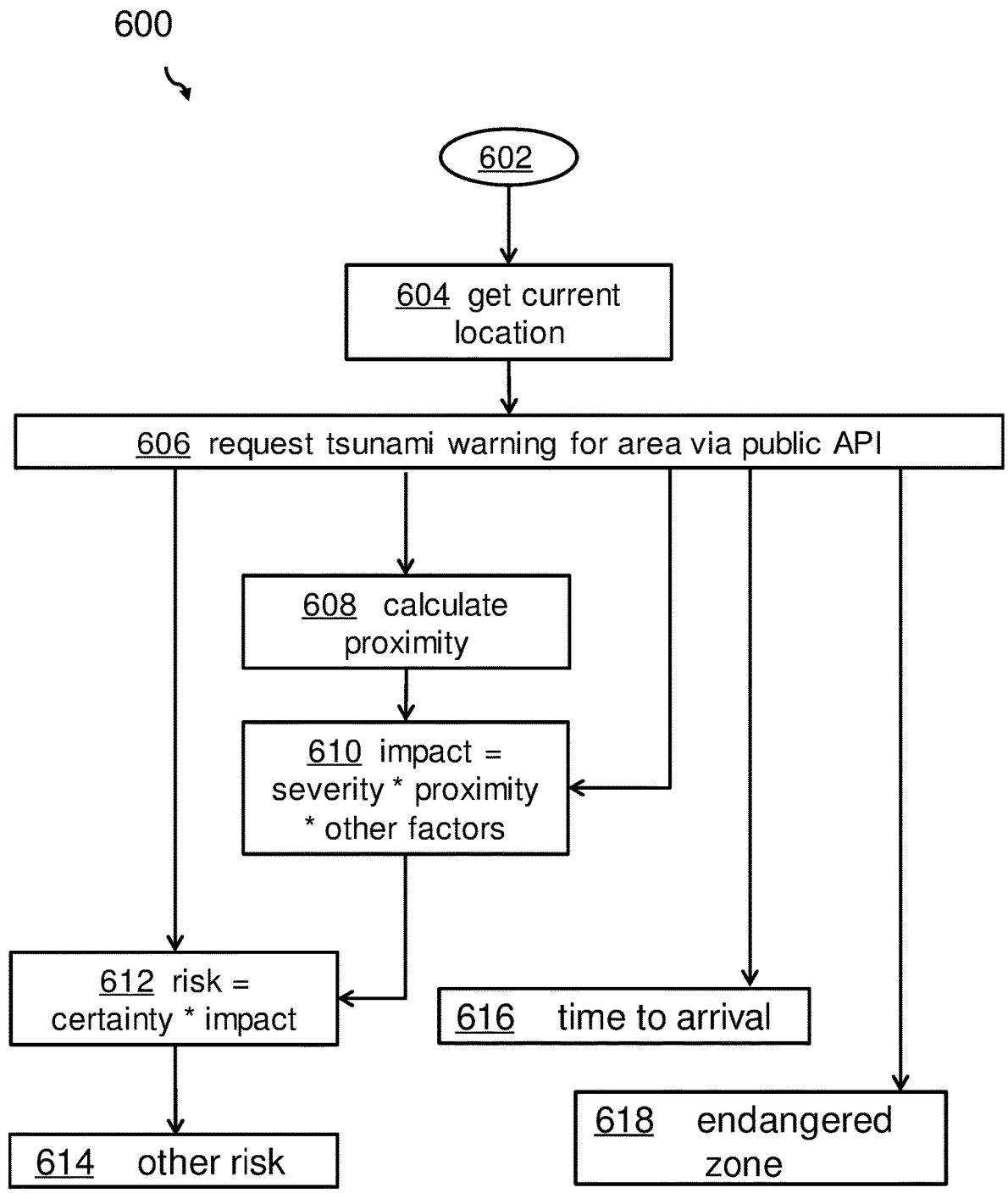

FIG. 6 shows a flowchart of an example method for backing up data in the event of a forecast tsunami in accordance with some embodiments of the present disclosure.

Figure 7:
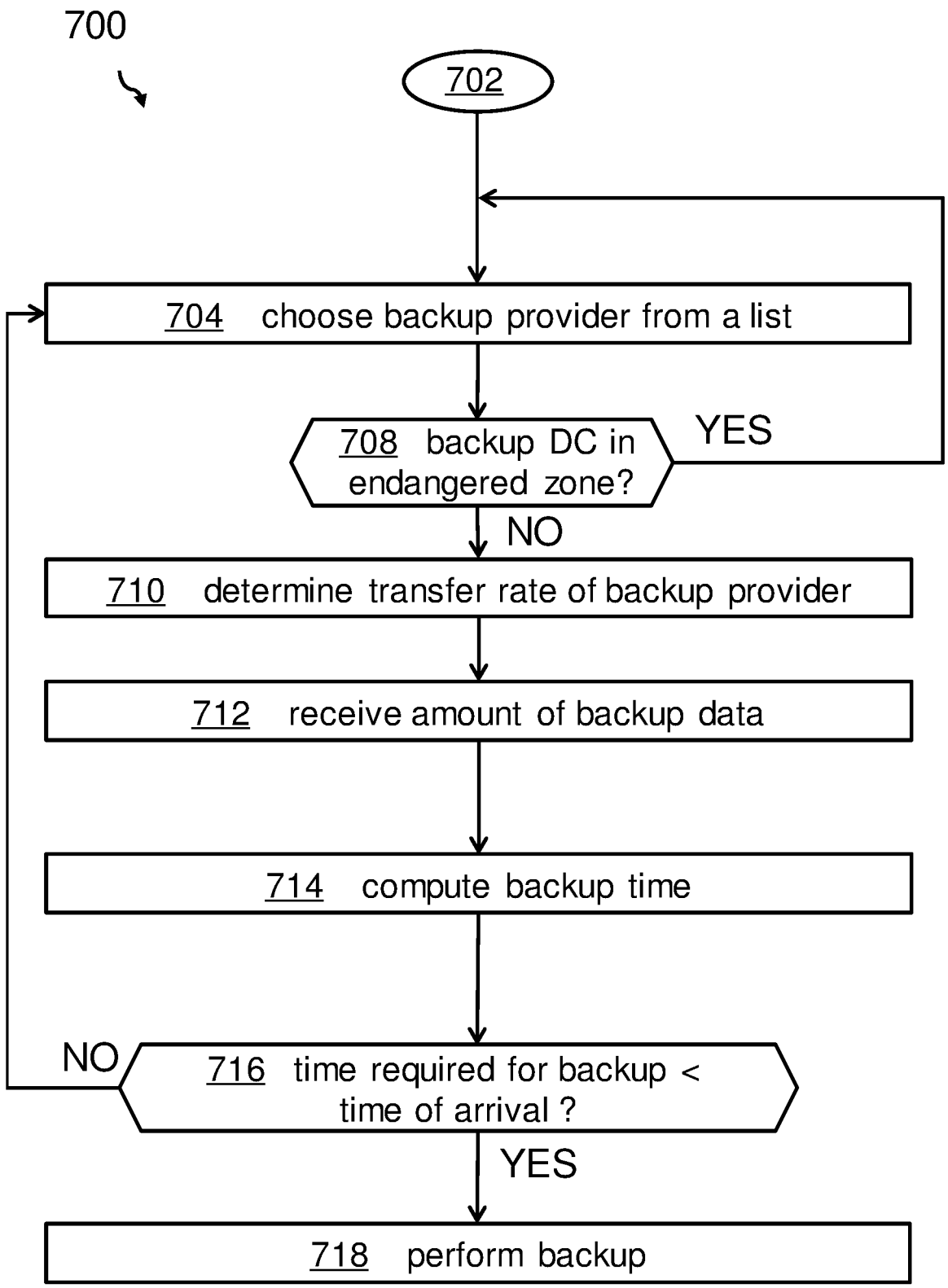

FIG. 7 shows a flowchart of an example method for determining the backup destination in accordance with some embodiments of the present disclosure.

Figure 8:
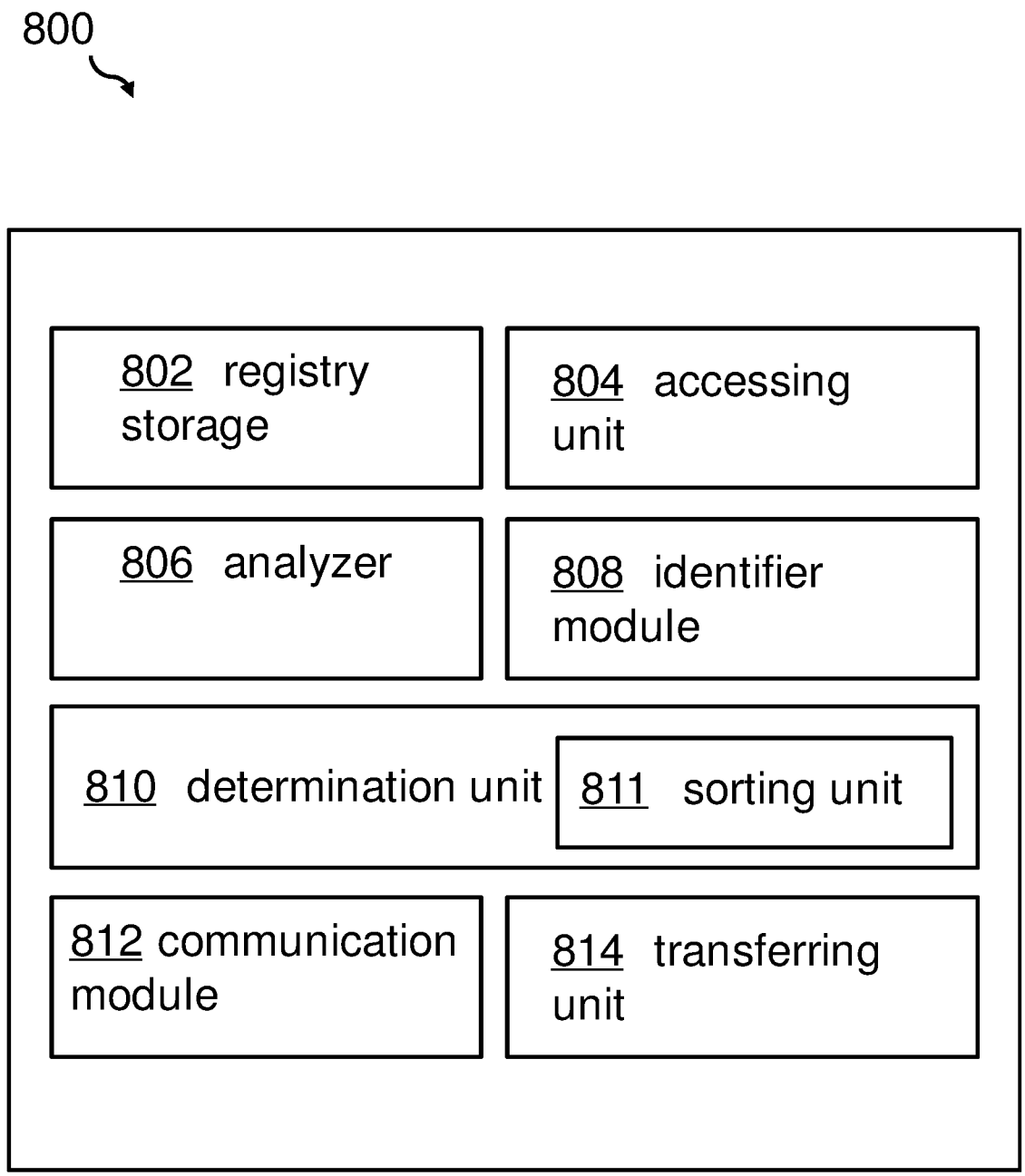

FIG. 8 shows a block diagram of an example data protection system in accordance with some embodiments of the present disclosure.

Figure 9:
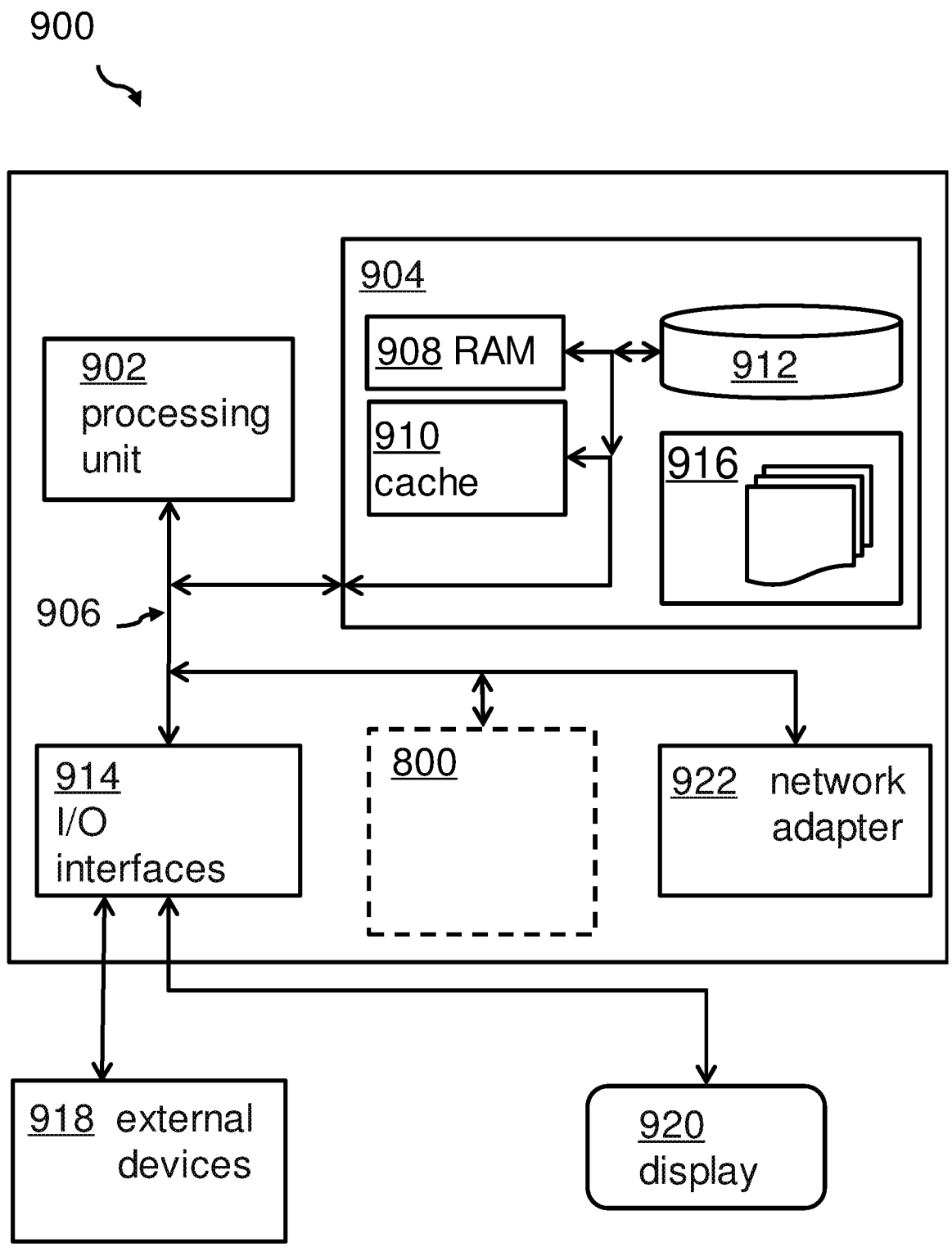

FIG. 9 shows an embodiment of an example computing system for improving integrity and availability of data in at least one data center.

DETAILED DESCRIPTION

In case of a natural disaster, e.g., volcano eruption, tsunami, tornado and/or hurricane backup data must often be stored locally, and the mission-critical data of an organization or an individual may be severely endangered. In view of an upcoming natural disaster, it is hard to select in advance a service provider for backing up mission-critical data in a short period of time (e.g., just prior to the natural disaster). Hence, data owners who want to protect their data in case of expected natural disasters are faced with the challenge to find the right place, i.e., the best backup service provider, having the required capacity and bandwidth.

Existing backup solutions typically concentrate on the amount of data to be transferred to another media, e.g., from disk to disk, from disk to tape or from disk to a cloud service provider, etc. Large amounts of data, e.g., content of business related databases, images, videos, text documents, etc., either require a high bandwidth transfer method or require a long transmission time. In case of an upcoming natural disaster, these factors may become the decision points for potential remote backup locations; and they may also be influenced by the type of the natural disaster and its characteristics. Known backup solutions are typically focused on individual aspects of disaster recovery solutions based on fail-over, high availability and/or mirroring options. However, speedy decision-making for the best backup location in the event of upcoming natural disasters may play a key role for the survival of enterprise data.

In the context of this description, the following conventions, terms and/or expressions may be used:

The term 'forecast' may denote a prediction of upcoming, expected events. The forecast may be based on analyzing historic data and comparing them with actually measured data. Typical forecasts may be performed for weather conditions. They may be based on public or commercial data sources, like weather portal from, e.g., wetter.de, wetter.com, Wunderground-Wetterdaten, Deutscher Wetterdienst, Unwetter-Zentrale, Storm Prediction Center, National Digital Forecast Database, (NDFD), National Weather Service Using APIs for Tsunamis, National Weather Service, The Weather Company, volcano observation stations, and many more.

However, other forecasts may be made and used as the basis for the proposed method, e.g., a forecast for a probability for a cyber-attack—or another criminal attack. Specially designed indicators may be used as predictive data source, e.g., cyber-attack index values which may be available from a variety of commercial and/or public providers.

The term 'monitorable event' may denote events that may be predictable based on data that can be monitored. In case of the weather, actual and historic weather data may be the prediction basis. Other predictable events may have other data sources.

The term 'region' may denote a geographical region. In case a data center may be based in New York, the greater New York area may be the region. The same may—in a comparable way—be applicable for Paris/Paris-Greater-Area. These examples may be useful for weather events. However, the size of the region may also be related to an expected event. For volcano events the total region influenced may be much bigger than the direct neighborhood of the data center. Thus, the region of the data center may be a portion of the volcano influenced area.

In case of a cyber-attack—to name another example—the region may be much bigger in terms of geography, e.g., the United States or Europe, or may be country/state oriented. In again other cases, the region may also be a logical region, like all utility companies of a country, or all smart meters of a utility company. Thus, the definition of the region may be defined geographical or also according to virtual boundaries.

The term 'potential threat' may denote an event that may harm the data center's operation and thus the data stored in the related data center. Whenever the data stored in the data center may be endangered—potentially corrupted, negatively influenced in terms of integrity or availability—this may mean a potential threat.

The term 'suitable backup service provider' may denote a data center having the attributes required to ensure a safe data storage in terms of integrity and availability for the users. It may also reflect the required capacity as well as bandwidth and another attribute, e.g., cost.

The term 'best-match backup service provider' may denote one individual backup data center which may be selected out of the group a potentially available data center serving as backup data center for a selected data source. Such a selection situation may occur if a plurality—minimum of two—data centers may serve as a potential backup data center, i.e., a backup service provider.

The term 'hurricane' may denote a rapidly rotating storm system.

The term 'cyclone' may denote a large-scale air mass that rotates around a strong center of low atmospheric pressure. Different types of cyclones are known, like warm-core cyclones, e.g., tropical cyclones or subtropical cyclones.

The term 'tornado' may denote a weather phenomenon in form of a rapidly rotating column of air that is in contact with both the surface of the Earth and a cumulonimbus cloud or, in rare cases, the base of a cumulus cloud. They are often referred to as twisters, whirlwinds, although the word cyclone is used in meteorology to name a weather system with a low-pressure area in the center around which winds blow counterclockwise in the Northern Hemisphere and clockwise in the Southern Hemisphere.

The term 'tsunami' or tidal wave, also known as a seismic sea wave, may denote a series of waves in a water body caused by the displacement of a large volume of water, generally in an ocean or a large lake. Earthquakes, volcanic eruptions and other underwater explosions (including detonations of underwater nuclear devices), landslides, glacier calvings, meteorite impacts and other disturbances above or below water, all have the potential to generate a tsunami. Unlike normal ocean waves which are generated by wind or tides which are generated by the gravitational pull of the Moon and Sun, a tsunami is generated by the displacement of water. However, normal ocean waves and tides which may cause a flooding may also fall under the expression monitorable events causing a threat to a data center.

The term 'volcano weather' may denote an atmospheric situation in which a volcano pushes ashes into the atmosphere so that all installations may be impacted, including data centers.

The term 'space weather' may denote time-varying conditions within the solar system, including the solar wind, emphasizing the space surrounding the Earth, including conditions in the magnetosphere, ionosphere and thermosphere which may have a direct impact on electronic systems.

The term 'the dark side of the Earth' may denote the side of the Earth not exposed by the light of the sun. Because of the rotation of the Earth around its own axis, the dark side of the Earth—or the shadow side—is a moving region always covering a changing 50% of the surface of the Earth.

The term 'criminal attack' may denote any harmful action against a normal operation of a data center. The criminal attack may be caused from a person inside the data center facilities or from the outside. A criminal attack may also be a potential threat. It may also be possible to predict a probability for a criminal attack in a given time period.

The term 'cyber-attack' may denote a direct attack using information technology to attack the data center or the associated network(s). A cyber-attack may be seen as any type of offensive maneuver employed by nation/states, individuals, groups, or organizations that target computers, information systems, infrastructures, computer networks, and/or personal computer devices by various means of malicious acts usually originating from an anonymous source that either steals, alters, or destroys a specified target by hacking into a susceptible system.

The term 'blockchain' may denote a distributed database that may be used to maintain a continuously growing list of records, called blocks. Each block may contain a timestamp and a link to a previous block. A blockchain may typically be managed by a peer-to-peer network collectively adhering to a protocol for validating new blocks. By design, blockchains may be inherently resistant to modifications of the data. Once recorded, the data in any given block cannot be altered retroactively without the alteration of all subsequent blocks and the collusion of the network. Functionally, a blockchain may serve as an open, distributed ledger that may record transactions between two parties efficiently and in a verifiable and permanent way.

The proposed method for improving integrity and availability of data in at least one data center may offer multiple advantages and technical effects:

The proposed method and system may comprise an automatic decision-making system of how to best protect data—either enterprise data or privately owned data—in case of an expected or predicted natural (or human caused) disaster by which a data center—or computer or storage system storing enterprise of personal data—may be directly or indirectly endangered and/or affected negatively by the disaster. Typically, natural disasters may be weather based. Thus, a plurality of weather forecasting services may deliver input for the required prediction. However, cyber-attacks or other criminal attacks may also represent a non-negligible factor in the efforts for securing data.

The proposed method and systems may use information about other data centers in a network of data centers including the knowledge about their capacities and data transmission speeds as well as other factors and apply an optimization algorithm based on a cost function to determine a best suitable data center as best-match backup service provider or target data center for the backup. This way, a fast decision regarding potential backup data centers may be performed and a best-match backup data center may be selected automatically by applying predefined rules in order to optimize a cost/benefit function. No complex and time-consuming human-driven decision processes for a backup strategy is required when facing expected and/or unexpected disasters. Additionally, high-performance, sophisticated technologies may be used in order to detect and predict a probability for a (natural) disaster, e.g., cognitive computing.

In the following, additional embodiments of the present disclosure will be described:

According to some embodiments, analyzing the forecast of monitorable events and/or the determination of the suitable backup service provider may be performed by a cognitive engine. Any kind of cognitive engine may be used, such as, for example, classification systems, machine learning, artificial intelligence, augmented intelligence and so on. These cognitive engines may be trained in order to determine a potential threat level for the data center in question. Based on the input—e.g., weather forecasts—potential threat levels for potential target data centers for backups may be determined. All of the analysis data may then be used as input for a determination unit adapted for selecting a best-match backup service provider, i.e., a best-match target data center to which the endangered (e.g, at-risk, threatened, susceptible, vulnerable, etc.) data may be transferred to or backed up to.

According to some embodiments, the potential threat may be selected out of the group comprising at least a hurricane, a cyclone, a tornado, a tsunami, volcano weather, space weather, a criminal attack and a cyber-attack. Thus, typical natural disasters may be based on weather effects; however, other—e.g., human made risk situations—factors may be reflected as long as at least certain level of practicability is given.

According to some embodiments, in case the potential threat is related to a tsunami, the suitable backup service provider may at least be a predefined first distance—e.g., 30 kilometers, other distances also possible—away from the source data center. Additionally, the suitable backup service provider may be on a higher geographical level than the source data center. Thus, the distance of the target data center may be adjustable to rules and regulations, and it may be decided initially, that the target data center may have less potential to be inundated, damaged, or otherwise harmed by a flood.

According to some embodiments, in case the potential threat is related to volcano weather, the suitable backup service provider may at least be a predefined second distance—e.g., 100 kilometers, other distances also possible depending on the severity of the volcano weather—away from a kill zone of the related volcano. The suitable backup service provider may also be located outside a primary and a secondary ash zone of the related volcano. Thus, precautions may be made that the volcano weather may not have any negative influence of the backup data center.

According to some embodiments, in case the potential threat is related to a hurricane or a cyclone, the suitable backup service provider may at least be a predefined third distance—e.g., 100 kilometers, other distances are possible—away from spiral bands of a related hurricane. Furthermore, the suitable backup service provider may be located at least outside another predefined distance—e.g., 50 km, other distances possible—away from pre-cyclone squall lines. These precautions may be useful in securing enterprise data in case of a hurricane or a cyclone.

According to some embodiments, in case the potential threat is related to a tornado, the suitable backup service provider may at least be a predefined fourth distance—e.g., 50 kilometers, other distances are possible—away from a predicted path width of the related tornado. In addition, the suitable backup service provider may at least be a predefined fifth distance—e.g., 50 kilometers, other distances are possible—away from a predicted path length of the related tornado, and in case hail is associated with the tornado, the suitable backup service provider may at least be a predefined sixth distance—e.g., 100 kilometers, other distances are possible—away from the related tornado. As one can see, a high flexibility in terms of rules and distances may be applied when selecting a backup data center.

According to some embodiments, in case the potential threat is related to a cyber-attack, the target data center may be located in a region with a lower cyber-attack index level than the source data center. In this case, the data in the source data center may be moved from the source data center to the target data center; thus, no original data may be left in the potentially attacked data center (e.g., the data center at an elevated risk for attack); thus, they may not be compromised by a cyber-attack. The same may apply for other criminal attacks/threats.

According to some embodiments, in case the potential threat is related to space weather, the suitable backup service provider may be located on the dark side of the Earth. Thus, if the space weather is related to solar winds, the suitable backup service provider or backup data center may lie in the wind shadow and may thus be protected. Consequently, a continued backup may be possible and/or required in a journey around the world (the Earth) as long as the duration of the space weather continues.

According to some embodiments, the backup service provider registry may be located within one of the data centers or a central place for all data centers of the network. Alternatively, the backup service provider registry may be in parts (e.g., separately backed up portions in separate data centers of the network) or completely replicated on all or a subset of the data centers of the network. Thus, for the pickup service provider registry, a constant data security option may be available. In some embodiments, it may also be possible to securely distribute the backup service provider registry across a plurality of the data centers of the network using blockchain technology.

According to some embodiments, determining the best-match backup service provider may comprise sorting the related plurality of data centers usable as suitable backup service providers in a ranking depending on the type of the potential threat and a set of predefined rules optimizing a function having an appropriate storage capacity, an appropriate location identifier, an appropriate data transfer bandwidth and other appropriate costs as parameters. Hence, depending on the actual available target data centers and selectable, adjustable and adaptable rules, a best-match target data center may be selected acting as a backup service provider.

It is noted that instead of the aforementioned costs, other attributes may be used: e.g., operating company contractual situation, availability of power backup facilities, solar energy driven.

In the following, a detailed description of the figures will be given. All instructions in the figures are schematic. Firstly, an example block diagram of an embodiment of the disclosed method for improving integrity and availability of data in at least one data center is given. Afterwards, further embodiments, as well as embodiments of the data protection system for improving integrity and availability of data in at least one data center, will be described.

FIG. 1 shows an example block diagram of an embodiment of the method 100 for improving integrity and availability of data stored in at least one data center. The data center is part of a network of data centers. Each of the data centers in the network is adapted to act as a backup service provider for any of the other data centers. The method comprises registering, 102, backup service profile data such as, for example, in one or more backup service provider records which may be time-stamped, of each of the data centers in a backup service provider registry with at least information about each data center's free storage capacity, a location identifier, a data transfer bandwidth and another attribute, such as, for example, a cost. For each data center a specific at least one (or more) time-stamped record(s) may be maintained. Updates of these records may be performed periodically (e.g., at predefined time intervals) or continuously, meaning that every change may cause an update of the related record. The backup service provider registry may be stored in any of the data centers of the network or the backup service provider registry may be maintained outside of the network of data centers at a secured storage and operating location. In any case, access to the backup service provider registry may be possible from each data center. Blockchain technology may be useful to maintain the backup service provider registry.

The method 100 comprises further accessing, 104, a forecast (e.g., at least one forecast of monitorable events for a region in which the data center is located in). The forecast (s) may be provided from at least one forecasting service. In case a plurality of forecasting services may be used, the data delivered by the forecasting services may be aligned in the next step. This next step is characterized by analyzing, 106, the forecast data of monitorable events in order to predict a potential threat for the region (e.g., the region in which the data center is located).

Next, the method 100 comprises identifying, 108, at least one source data center within the network of data centers in the region with at least one potential threat, and determining, 110, at least one data center within the network of data centers to be used as suitable backup service provider by accessing and using data stored in the backup service provider registry. It may be ensured that the suitable backup service provider may be outside the endangered region.

Furthermore, the method 100 comprises, in case more than one suitable backup service providers have been identified, determining, 112, a best-match backup service provider as target data center. Rules ensuring that the best-match backup service provider, i.e., best suitable backup data center, has been identified, may be predefined and determination methods may involve a plurality of dependencies and constraints, e.g., in the form of geo-political conditions, competitive aspects, diversity aspects, etc.

Finally, the method 100 also comprises establishing, 114, a backup communication connection between the source data center and the target data center, and transferring, 116, data from the source data center to the target data center (DC). The data transfer may involve at least one of the following processes: copying, backup, transferring, i.e., the data may not be left physically in the source data center. Any of the mentioned processes may additionally comprise compression, encryption, and/or the usage of public data lines or private data lines.

It may also be noted that the predefined rules being usable as additional input to an optimization function (technically it may be a cost function in the sense of higher or less burden according to the constraints and not in monetary values) used for determining the best-match backup data center may also have a (potentially time-dependent) setting for a decision whether an organization operating a data center will only use its own backup data centers or one chosen from a recommended backup service provider according to aspects of the present disclosure. A central backup service provider organization may coordinate the services from the all backup service provider data centers. The central backup service provider can be informed about potential backup service providers via: (a) organizations that enter their remote data center characteristics, or (b) backup service providers might register at the data protection engine using the backup service provider registry.

FIG. 2 shows a block diagram of a flowchart 200. In some embodiments, the method 200 is a sub-method of the method 100. The backup process to a remote (e.g., backup) data center, may be initiated either by an actual emergency (compare 202; e.g., fire, flood, power outage recoverable for a certain amount of time by an uninterruptible power supply, etc.) of the data center in focus or, by a predictable threat, as discussed in the context of FIG. 1 (compare 204).

In such a case, the capacity of the source data center in question, (e.g., as a data sink) is reduced to zero, 206, and is communicated to the backup service provider registry. Thus, other potential source data centers are informed that the source data center in question may be in trouble, (e.g., its operation may be endangered by a potential threat) and that it may no longer be used as backup service provider.

The capacity of the data center as a data source is increased to the amount of data to be secured remotely, 208. As a next step, the data of the source data center are backed up (or transferred or copied, see above) at a target data center, acting as a data sink, 210. This may be performed according to the method 100 or based on a manual decision.

FIG. 3 shows an example block diagram of an example cost calculation 300. Using the model in which each data center may be seen as a data source and/or a data sink, the need to move data away from a location can be viewed as voltage; data being transferred to another location can be seen as current; and, the network bandwidth/costs (also other attributes) can be viewed as resistance of connections between nodes. Thus, the network of data centers may be seen as an equivalent of an electric circuit to which the Kirchhoff's Laws of Electricity may be applicable: in each electrical node of a closed electrical network, the sum of all incoming and outgoing currents is zero (e.g., $I_1+I_2+I_3-I_4-I_5=0$ as shown in FIG. 3). Therefore, each data center is characterized by two capacity values: (a) how much additional backup data could be stored additionally (node acts as data sink), (b) how much data may need to be backed up externally (node acts as data source)

This model may be used as a basis for an optimization function when selecting a backup service provider. It may involve the capacity of the backup service provider data center, the available bandwidth/transmission speed between the two involved data centers and cost per amount of data (e.g., per terabyte). Alongside these technical aspects, additional predefined rules may be used as input parameters for the optimization function. In order to determine the best-match backup service provider, a local or global minimum (or maximum) of the optimization function may be determined, also reflecting strategic aspects, as mentioned above.

FIG. 4 shows an embodiment of a network 400 of data centers. Each of the nodes 402 (although only some of the nodes have reference numerals, each node 402 can represent a respective data center) may be linked to one or more other data centers by, for example, wire data transmission lines. The data network between the different data centers may be physical lines and/or a virtual network. The physical basis for the network may be, individually or in combination, copper-based, fiber-based, and/or wireless.

FIG. 5 shows an embodiment of a flowchart 500 detailing an example general process flow from a different perspective. In some embodiments, FIG. 5 may start before the process shown in FIG. 2. For example, in FIG. 2 it is already assumed that a threat is predicted or that there is an emergency situation. In contrast, in the method 500, after the start 502, the risk for a first threat and for a second threat is calculated in parallel—compare reference numerals 504 (calculating risk for $1^{st}$ threat for a location), 506 (calculating risk for $2^{nd}$ threat for the location). Potentially, more than two potential threats may be calculated in parallel. Basically all potential threat situations, as mentioned above, may be calculated in parallel. These risk levels may be normalized so that they can be compared to a threshold value, 508. In case the risk levels are not normalized, an equivalent determination like the determination 508 has to be made for every potential threat. The threshold used in operation 508 can be, but is not limited to, one or more of a probability, a score, a level, an index, a warning, a percentage, or a different threshold.

If the risk level at operation 508 is below a threshold value, the method 500 can wait for a predetermined amount of time, 510, and return to the risk calculation in a cyclical manner. However, if the risk level is above the pre-defined threshold value, a backup location is chosen, 512, and the backup is performed, 514. The method 500 ends at 516.

FIG. 6 shows an example flowchart 600 detailing—as one example for a threat—a calculation for a tsunami. In some embodiments, the operations of FIG. 6 describe the threat calculation according to FIG. 5, reference numeral 504, 506 in more detail. The process starts at operation 602. It continues with requesting a current location in operation 604. This may be done using a GPS (global positioning service) system. Then, in operation 606, a tsunami warning may be requested for the area of the current location via one or more APIs (application programming interface) of one or more tsunami warning providers. As a result, the time of arrival (operation 616) of the tsunami may be received as well as a description of the endangered zone (operation 618).

Furthermore, the proximity of the current location to the endangered zone can be calculated in operation 608. The impact as a product of severity and proximity (and potentially other factors) can be calculated in operation 610. The severity value is received as a result of the tsunami warning request. The severity may have, e.g., a normalized value between 0 and 1. Similarly, the other variables, like the proximity factor, may have normalized values between 0 and 1.

The impact may be calculated in operation 612, based on the certainty of the forecast—which may also have normalized value between 0 and 1—which may also be a result of the request the tsunami warning. Afterwards, the process may be repeated for other risks with requests for other threats in operation 614. Thus, the output values of the risk calculation for every threat can be: a normalized risk factor between 0 and 1, a time of arrival (e.g., in hours), and the endangered zone.

If, for example, a tsunami has a certainty of 0.6, the proximity factor has a value of 0.5, and the severity value is 0.8, then the impact may be calculated by 0.5×0.8 equals 0.4 (operation 610). Consequently, the risk level may be calculated as 0.6×0.4 equals 0.24 (operation 612). This value may be compared against a predefined threshold value for a tsunami risk.

FIG. 7 shows a flowchart 700 illustrating an example method for how the backup destination is determined. In some embodiments, the operations of FIG. 7 describe the operation "choose backup destination" 516 according to FIG. 5 in more detail. The process starts at 702. A potential backup provider is chosen from a list in operation 704. Then it is determined whether the backup data center (potential backup service provider) lies physically in the endangered zone, 708. If that is the case, the process returns to the step of choosing a backup provider, 704. This time, another backup provider is chosen from the list.

In case the selected backup data center is not in the endangered zone—case "N"—a transfer rate to the backup service provider is determined in operation 710. It may be measured in GB/h and it may be determined with, for example, test backup data. In operation 712, the amount to be backed up is received. Based on the amount of data to be backed up and the transfer rate, a backup time is calculated in operation 714. Operation 714 can determine a backup time by dividing the amount of data through the backup speed.

In operation 716, it is determined whether the time to do the backup is smaller than the arrival time of the threat (e.g., the tsunami). If that is not the case, the process returns to the beginning by choosing another potential backup service provider from the list. Otherwise—case "Y"—the backup is performed in operation 718.

As a concrete example, the following may be assumed: a tsunami is expected to arrive and Los Angeles in 12 h. The amount of data to be backed up may be 80 GB. As location for a takeover data center Melbourne is selected, which may provide a data transfer rate of 10 GB/h. It is also determined that the backup service provider data center is outside the endangered area (other continent). The backup time is calculated by 80 GB/10 GB/h=8 h. Because the backup time of eight hours is below the expected arrival time of the tsunami (12 h) the backup location is valid and the backup can be performed.

FIG. 8 shows an example data protection system 800 for improving integrity and availability of data in at least one data center. In some embodiments, each of the data centers in the network can act as a backup service provider. The data protection system can comprise a registry storage 802 adapted for registering backup service profile data of each of said data centers at a backup service provider registry with at least information about each data center's free storage capacity, a location identifier (potentially GPS based), a data transfer bandwidth (potentially also actual transfer speed) and costs. Additional parameters/attributes are possible in order to also access environmental parameters (e.g., operating company contractual situation, availability of power backup facilities, DC solar energy driven).

The system 800 can further comprise an accessing unit 804 adapted for accessing a forecast of monitorable events for a region, in which the data center is located. The forecast(s) can come from one or more forecast services. An analyzer 806 can be adapted for analyzing the forecast of monitorable events in order to predict a potential threat for said region (e.g., an event under which the data in the data center may be endangered).

The identifier module 808 can be adapted for identifying at least one source data center within said network of data centers in said region with the potential threat, and a determination unit 810 can be adapted for determining at least one data center within the network of data centers to be used as a suitable backup service provider by accessing and using data stored in the backup service provider registry. The determination unit 810 can also adapted for determining a best-match backup service provider as target data center if more than one suitable backup service providers is identified. This may be achieved by a sorting unit 811.

A communication module 812 can be adapted for establishing a backup communication connection between the source data center and the target data center in order to, e.g., establish a secure data transmission, and a transferring unit 814 is adapted for transferring the data to be secured from the source data center to the target data center.

It may be noted that the data protection system 800 may be implemented in one of each data center of the network. However, it may also be implemented as a single entity inside one data center of the network or external to any one of the data centers. In this case the data protection system 800 may make its service available to each data center in the network. The data centers may then register their capabilities with the data protection system, (e.g., the related backup data center registry). All activities for prediction and recommendation may then be performed centrally. The data protection system may also comprise backup facilities for its own operation. Alternatively, the general function of the data protection system may be implemented in each data center of the network building a completely distributed solution.

Embodiments of the disclosure may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system and is not intended to suggest any limitation as to the scope of use or functionality of embodiments of the disclosure described herein. Regardless, computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couples various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random access memory (RAM) 908 and/or cache memory 910. Computer system/server 900 may further include other removable/non-removable, volatile/non-volatile computer system storage media. By way of example only, storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the disclosure (e.g., any of the methods illustrated in any of FIGS. 1-2, 5-7, any of the operations or concepts shown in FIGS. 3-4, and/or virtualization of the system 800 of FIG. 8).

The program/utility, having a set (at least one) of program modules 916, may be stored in memory 904 by way of example, and not limitation, as well as an operating system, one or more application programs, other program modules, and program data. Each of the operating system, one or more application programs, other program modules, and program data or some combination thereof, may include an implementation of a networking environment. Program modules 916 generally carry out the functions and/or methodologies of embodiments of the disclosure as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. This network adapter 922 may be instrumental for a communication to the other computers or servers of other data centers in the network.

It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

Additionally, the data protection system 800 for improving integrity and availability of data in at least one data center may be attached to the bus system 906.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

What is claimed is:

1. A method for improving integrity and availability of data in at least one data center, wherein said data center is part of a network of data centers, wherein each of said data centers in said network is adapted to act as a backup service provider, the method comprising:
   registering backup service profile data of each of said data centers at a backup service provider registry with at least information about each data center's free storage capacity, a location identifier, a data transfer bandwidth, and another attribute;
   accessing a forecast of monitorable events for a region said data center is located in from at least one forecast service;
   analyzing said forecast of monitorable events in order to predict a potential threat for said region;
   identifying at least one source data center within said network of data centers in said region with said potential threat;
   determining at least one data center within said network of data centers to be used as suitable backup service provider by accessing and using data stored in said backup service provider registry;
   in case more than one suitable backup service providers is identified, determining a best match backup service provider as target data center;
   establishing a backup communication connection between said source data center and said target data center; and
   transferring data from said source data center to said target data center.

2. The method according to claim 1, wherein said analyzing said forecast of monitorable events and said determining said suitable backup service provider is performed by a cognitive engine.

3. The method according to claim 1, wherein said potential threat is selected from the group consisting of a hurricane, a cyclone, a tornado, a tsunami, volcano weather, space weather, a criminal attack, and a cyber-attack.

4. The method according to claim 3, wherein in case said potential threat is related to a tsunami:
- said suitable backup service provider is at least a predefined first distance away from said source data center; and
- said suitable backup service provider is on a higher geographical level than said source data center.

5. The method according to claim 3, wherein in case said potential threat is related to a volcano weather:
- said suitable backup service provider is at least a predefined second distance away from a kill zone of a related volcano; and
- said suitable backup service provider is located outside a primary and a secondary ash zone of said related volcano.

6. The method according to claim 3, wherein in case said potential threat is related to a hurricane:
- said suitable backup service provider is at least a predefined third distance away from spiral bands of the hurricane.

7. The method according to claim 3, wherein in case said potential threat is related to a tornado:
- said suitable backup service provider is at least a predefined fourth distance away from a predicted path width of said tornado;
- said suitable backup service provider is at least a predefined fifth distance away from a predicted path length of said tornado; and
- said suitable backup service provider is at least a predefined sixth distance away from said tornado, wherein the predefined sixth distance is associated with hail associated with said tornado.

8. The method according to claim 3, wherein in case said potential threat is related to a cyber-attack:
- said target data center is located in a region with a lower cyber-attack index level than said source data center; and
- wherein transferring data further comprises moving said data in said source data center from said source data center to said target data center.

9. The method according to claim 3, wherein in case said potential threat is related to space weather:
- said suitable backup service provider is located on a dark side of Earth.

10. The method according to claim 1, wherein said backup service provider registry is located within one, or a subset of, said data centers.

11. The method according to claim 1, wherein said backup service provider registry uses blockchain technology to securely distribute said backup service provider registry across a plurality of said data centers of said network.

12. The method according to claim 1, wherein determining said best-match backup service provider further comprises:
- sorting a plurality of data centers suitable as backup service provider in a ranking depending on a type of said potential threat and a set of predefined rules optimizing a function having said storage capacity, said location identifier, data transfer bandwidth, and said another attribute as parameters.

13. A data protection system for improving integrity and availability of data in at least one data center, wherein said data center is part of a network of data centers, wherein each of said data centers in said network acts as a backup service provider, said data protection system comprises a processor and a computer-readable storage medium storing program instructions which, when executed by the processor, are configured to cause the processor to perform a method comprising:
- registering backup service profile data of each of said data centers at a backup service provider registry with at least information about each data center's free storage capacity, a location identifier, a data transfer bandwidth, and another attribute;
- accessing a forecast of monitorable events for a region, said data center is located in, from at least one forecast service;
- analyzing said forecast of monitorable events in order to predict a potential threat for said region;
- identifying at least one source data center within said network of data centers in said region with said potential threat;
- determining at least one data center within said network of data centers to be used as suitable backup service provider by accessing and using data stored in said backup service provider registry, and determining a best match backup service provider as target data center if more than one suitable backup service providers is identified;
- establishing a backup communication connection between said source data center and said target data center; and
- transferring data from said source data center to said target data center.

14. The data protection system according to claim 13, wherein said analyzing and said determining are performed by at least one cognitive engine.

15. The data protection system according to claim 13, wherein said potential threat is selected from the group consisting of: a hurricane, a cyclone, a tornado, a tsunami, volcano weather, space weather, a criminal attack and a cyber-attack.

16. The data protection system according to claim 15, wherein in case said potential threat is related to a tsunami:
- said suitable backup service provider is at least a predefined first distance away from said source data center; and
- said suitable backup service provider is on a higher geographical level than said source data center.

17. The data protection system according to claim 15, wherein in case said potential threat is related to a cyclone:
- said suitable backup service provider is located at least a predefined other distance away from pre-cyclone squall lines.

18. The data protection system according to claim 15, wherein in case said potential threat is related to a cyber-attack:
- said target data center is located in a region with a lower cyber-attack index level than said source data center; and
- said source data center is adapted to move said data from said source data center to said target data center.

19. The data protection system according to claim 13, wherein determining the best match backup service provider further comprises:
- sorting a plurality of data centers suitable as backup service provider in a ranking depending on a type of said potential threat and a set of predefined rules optimizing a function having said storage capacity, said location identifier, data transfer bandwidth, and said another attribute as parameters.

20. A computer program product for improving integrity and availability of data in at least one data center, wherein said data center is part of a network of data centers, wherein each of said data centers in said network is adapted to act as a backup service provider, said computer program product comprising a computer readable storage medium having program instructions embodied therewith, said program instructions being executable by one or more computing systems to cause said one or more computing systems to:

- register backup service profile data of each of said data centers at a backup service provider registry with at least information about each data center's free storage capacity, a location identifier, a data transfer bandwidth, and costs;
- access a forecast of monitorable events for a region, said data center is located from at least one forecast service;
- analyze said forecast of monitorable events in order to predict a potential threat for said region;
- identify at least one source data center within said network of data centers in said region with said potential threat;
- determine at least one data center within said network of data centers to be used as suitable backup service provider by accessing and using data stored in said backup service provider registry;
- in case more than one suitable backup service providers is identified, determine a best match backup service provider as target data center;
- establish a backup communication connection between said source data center and said target data center; and
- transfer data from said source data center to said target data center.

* * * * *